United States Patent Office 3,026,337
Patented Mar. 20, 1962

3,026,337
NOVEL 5,9-CYCLOSTEROIDS AND METHODS FOR THEIR MANUFACTURE
Derek H. R. Barton, Northwood, England, and Cecil H. Robinson, Cedar Grove, N.J., assignors to Schering Corporation, Bloomfield, N.J., a corporation of New Jersey
No Drawing. Filed Feb. 2, 1961, Ser. No. 86,580
9 Claims. (Cl. 260—397.45)

This invention relates to a new group of compounds of the androstane and pregnane series and to methods for their manufacture. More particularly, this invention relates to androstanes and pregnanes including certain dehydro analogs thereof which uniquely have their respective 5 and 9 carbon atoms joined together so as to form an intra nuclear cyclic ring. The novel 5,9-cyclosteroids of this invention thus provide a direct route for the conversion of steroidal hormones and hormone intermediates containing a $\Delta^{1,4}$-dien-3-one system to the corresponding $\Delta^4$-3-ketones.

The novel compounds of our invention may be represented by the following general formula:

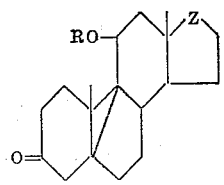

and including the $\Delta^1$-dehydro analogs thereof wherein R is a lower alkanoyl group and Z is a member of the group consisting of

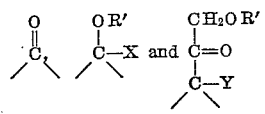

R' being a member of the group consisting of H and lower alkanoyl, X representing a member selected from the group consisting of H and lower alkyl and Y representing a member selected from the group consisting of H and OH.

Our novel compounds are prepared by reduction of a 9α-halo-11β-acyloxy pregnadiene or androstadiene with chromous chloride in a non-reactive organic solvent such as acetone or dioxane followed by hydrogenation in the presence of a catalyst. This reaction proceeds in general as follows:

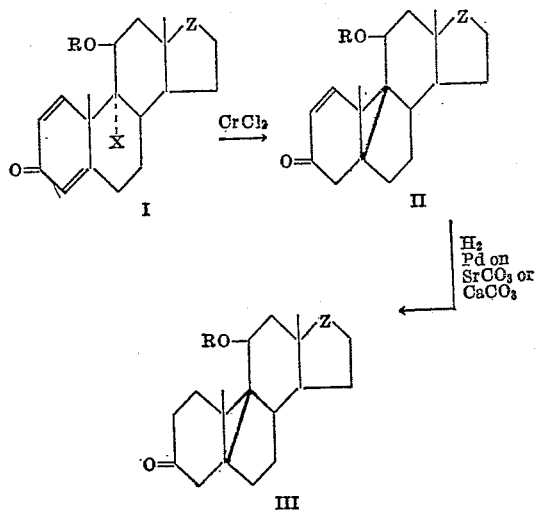

In the above reaction scheme X is halogen preferably bromine or iodine, R is lower alkanoyl and Z is as defined above. The starting substance (I) is a steroid diene such as 9α-bromo-prednisolone 11,21-diacetate or 9α-bromo-1,4-androstadiene-3-one-11β,17β-diol 11-acetate 17-propionate. Treatment of the bromo diene (I) with chromous chloride gives the 5,9-cyclosteroid (II). This reductive step is carried out in the presence of an inert solvent such as acetone or dioxane and preferably in the absence of oxygen so as to avoid decomposition of the reducing agent. Further, reduction of the 5,9-cyclosteroid (II) is accomplished by catalytic hydrogenation, for example, employing contact with a hydrogen atmosphere in the presence of a Pd-SrCO₃ catalyst or the like preferably in an organic solvent such as ethyl acetate to form the 1,2-dihydro analog, (III).

The above A ring saturated cyclosteroids (III) are transformable into $\Delta^{4,9(11)}$-dienes by the following reaction:

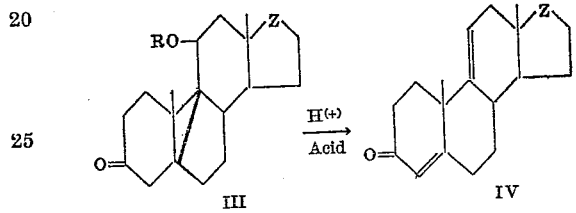

The above transformation takes place in the presence of an acid such as a non-oxidizing mineral acid, e.g. hydrogen chloride; a strong organic acid, e.g. p-toluenesulfonic acid or a Lewis acid, e.g. zinc bromide in ethanol.

The dienes represented by (IV) are known to be valuable intermediates in the preparation of therapeutically active substances such as 9α-fluorohydrocortisone, 9α-fluoro-11β-hydroxytestosterone and its 17-methyl analog. It is apparent, therefore, that we have provided a means for transforming a 9α-bromo (or iodo)-11β-hydroxy-3-keto-1,4-pregnadiene or androstadiene to the corresponding 9α-fluoro-$\Delta^4$-monoene. Thus, by our novel process and by employing our novel compounds there is provided a method for converting 9α-bromo-prednisolone or its 21-ester to 9α-fluorohydrocortisone. In a similar manner analogous transformations can be effected in the androstane series as well.

Included within the scope of our invention are the obvious equivalents of the novel 5,9-cyclosteroids such as their 16-methyl (both α and β) analogs, 6α-methyl analogs and the like.

The following examples more particularly point out our invention, and are intended merely to illustrate the same and are not intended to limit it in any manner. The proper scope of the invention may be determined only by reference to the appended claims.

EXAMPLE 1

*5,9-Cyclo-1-Pregnene-11β,17α,21-Triol-3,20-Dione 11β,21-Diacetate*

Chromous chloride solution (76 ml.; prepared according to the procedure of Djerassi et al., J. Am. Chem Soc., 72, 4077 (1950)) is added, all at once, to a stirred solution of 9α-bromo-1,4-pregnadiene-11β,17α,21-triol-3,20-dione 11β,21-diacetate (7.6 g.) in acetone (600 ml.) at room temperature. (Carbon dioxide gas is bubbled through the acetone solution for several minutes before the addition of chromous chloride, and an atmosphere of carbon dioxide is maintained in the reaction vessel thereafter).

The reaction mixture is left at room temperature for 5 minutes, and another 76 ml. portion of chromous chloride solution is added. Ten minutes after the second addition of chromous chloride, a third portion of chromous chloride solution (76 ml.) is added, and the reaction mixture is left at room temperature for 30 minutes. Water is now added, and the precipitated solid is filtered off, washed with water and dried in vacuo. The dry solid is now crystallized several times from ethyl acetate-methanol, to give the compound of this example, M.P. 186–191°; [α]$_D$+254° (dioxane);

$\lambda^{Nujol}_{max.}$ 3.00, 5.70, 5.78, 6.10, 8.15 μ

EXAMPLE 2

5,9-Cyclopregnane-11β,17α,21-Triol-3,20-Dione 11β,21-Diacetate

One gram of 5,9-cyclo-1-pregnene-11β,17α,21-triol-3,20-dione 11β,21-diacetate is dissolved in ethyl acetate (220 ml.) and is hydrogenated, using 15% palladium on calcium carbonate catalyst (1.0 g.), at 25°. The hydrogenation is stopped when the hydrogen uptake amounts to 1 mole per mole of steroid. The reaction mixture is then filtered, and the residue on the filter is washed with ethyl acetate. Evaporation in vacuo of the combined filtrate and washings then afford the crude product which is crystallized from acetone-hexane to give the compound of this example, M.P. 163–164° [α]$_D$—59°. The compound shows no selective ultraviolet absorption between 220 mμ. and 350 mμ., and has infrared absorptions (Nujol) at 2.85, 5.70, 5.78, 8.05 and 8.14 μ.

EXAMPLE 3

4,9(11)-Pegnadiene-17α,21-Diol-3,20-Dione 21-Acetate

A stream of dry hydrogen chloride is passed through a stirred solution of 5,9-cyclopregnane-11β,17α,21-triol-3,20-dione 11β,21-diacetate (300 mg.) in chloroform (60 ml.), at room temperature, for thirty minutes. The chloroform solution is then evaporated in vacuo, and the residue is crystallized several times from ethyl acetate to give 4,9(11)-pregnadiene-17α,21-diol-3,20-dione-21-acetate, M.P. 230–235°, [α]$_D$+122° (CHCl$_3$)

$\lambda^{MeOH}_{max.}$ 238 mμ. (16,200)

The infrared absorption spectrum matches the spectrum of an authentic sample of 4,9(11)-pregnadiene-17α,21-diol-3,20-dione 21-acetate.

EXAMPLE 4

5,9-Cyclo-1-Pregnene-11β,17α,21-Triol-3,20-Dione 11β-Formate 21-Acetate

To a stirred solution of 9α-bromo-1,4-pregnadiene-11β,17α,21-triol-3,20-dione 11β-formate 21-acetate (1.0 g.) in acetone (100 ml.), at room temperature, is added chromous chloride solution (30 ml.) in three 10 ml. portions exactly according to the procedure of Example 1. The reaction mixture is diluted with water and the resulting suspension is filtered. The residue is washed with water, dried and crystallized from acetone to give the compound of this example, M.P. 189–193°; [α]$_D$+254°;

$\lambda^{MeOH}_{max.}$ 272 mμ. (5,000); $\lambda^{Nujol}_{max.}$ 2.94, 5.75, 5.80, 5.84, 6.05, 8.15, 8.60 μ

EXAMPLE 5

5,9-Cyclo-1-Androstene-11β,17β-Diol-3-one 11β-Acetate 17β-Propionate

To a stirred solution of 9α-bromo-1,4-androstadiene-11β,17β-diol-3-one 11β-acetate 17β-propionate (1.0 g.) in acetone (100 ml.) is added chromous chloride solution (30 ml.) in three 10 ml. portions according to the procedure of Example 1. The reaction mixture is then diluted with water and the resulting precipitate is filtered off, washed with water and dried in vacuo. Crystallization from ether-pentane gives the compound of this example, M.P. 138–143°; [α]$_D$+184°

$\lambda^{MeOH}_{max.}$ 272 mμ. (4,900); $\lambda^{Nujol}_{max.}$ 5.78, 6.02, 6.18, 8.04, 8.45 μ

EXAMPLE 6

5,9-Cycloandrostane-11β,17β-Diol-3-one 11β-Acetate 17β-Propionate

One gram of 5,9-cyclo-1-androstene-11β,17β-diol-3-one 11β-acetate 17β-propionate is dissolved in ethyl acetate (150 ml.) and ethanol (70 ml.), and is hydrogenated, using 15% palladium on calcium carbonate catalyst (1.0 g.) at 25°. When the uptake of hydrogen is equivalent to one mole of hydrogen per mole of steroid hydrogenation is stopped, and the mixture is filtered. The residue on the filter is washed with ethyl acetate, and the filtrate and washings are combined. This solution is evaporated in vacuo, and the residue is crystallized from ether-pentane to give the compound of this example, M.P. 124–126°; [α]$_D$—150° (dioxane); no selective ultraviolet absorption between 220 and 350 mμ.

$\lambda^{Nujol}_{max.}$ 5.79, 8.02, 8.42 μ.

EXAMPLE 7

4,9(11)-Androstadien-17β-ol-3-one 17β-Propionate

A stream of dry hydrogen chloride is bubbled through a stirred solution of 5,9-cycloandrostane-11β,17β-diol 11β-acetate 17β-propionate (100 mg.) in chloroform (20 ml.) at room temperature. The solution is then evaporated in vacuo to a residue, which is crystallized several times from acetone-hexane to give 4,9(11)-androstadien-17β-ol-3-one 17β-propionate, M.P. 104–110°

$\lambda^{MeOH}_{max.}$ 240 mμ. (16,000)

the infrared spectrum (Nujol) matches the spectrum of an authentic sample of 4,9(11)-androstadien-17β-ol-3-one 17β-propionate.

Although the preceding examples illustrate the hydrogenation of the 5,9 cyclo pregnene and 5,9 cyclo androstene compounds to the corresponding 5,9 cyclo pregnane and 5,9 cyclo androstane compounds employing a palladized CaCO$_3$ catalyst it is of course to be understood that other equivalent alkaline earth metal palladized carbonate catalysts such as strontium and barium may be employed so long as they are mild hydrogenation catalysts and will not reduce the keto group in the 3 position.

We claim:

1. A compound selected from the group consisting of 5,9-cyclosteroids of the general structure:

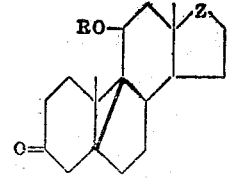

and the Δ$^1$-dehydro analogs thereof wherein R represents a lower alkanoyl group and Z is selected from the group consisting of

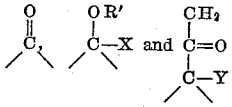

OR' and R' representing a member selected from the group consisting of H and lower alkanoyl, X representing a member selected from the group consisting of H and lower alkyl, and Y representing a member selected from the group consisting of H and OH.

2. 5,9 - cyclo - 1 - pregnene-11β,17α,21-triol-3,20-dione 11β,21-diacetate.

3. 5,9 - cyclopregnane - 11β,17α,21 - triol - 3,20 - dione 11β,21-diacetate.

4. 5,9 - cyclo - 1 - pregnene-11β,17α-21-triol-3,20-dione 11β-formate 21-acetate.

5. 5,9 - cyclo - 1 - androstene-11β,17β-diol-3-one 11β-acetate 17β-propionate.

6. 5,9 - cycloandrostane - 11β,17β - diol-3-one 11β-acetate 17β-propionate.

7. In a process for preparing a 5,9-cyclosteroid, the step which comprises reacting a steroid of the group consisting of 9α-X-3-keto-11β-lower alkanoyloxy-4-pregnenes, 9α-X-3-keto - 11β - lower alkanoyloxy-4-androstenes, and the 1,2-dehydro analogs thereof, X being a member selected from the group consisting of bromine and iodine, with chromus chloride in the presence of a non-reactive organic solvent.

8. A process according to claim 7 wherein the non-reactive organic solvent is acetone.

9. The process step of claim 7 wherein the starting material possesses a 1,2-double bond including the step of hydrogenating the chromus chloride reduction product in the presence of a palladized alkaline earth metal carbonate catalyst.

No references cited.

UNITED STATES PATENT OFFICE
CERTIFICATE OF CORRECTION

Patent No. 3,026,337                          March 20, 1962

Derek H. R. Barton et al.

It is hereby certified that error appears in the above numbered patent requiring correction and that the said Letters Patent should read as corrected below.

Column 4, lines 62 to 67 should appear as shown below instead of as in the patent:

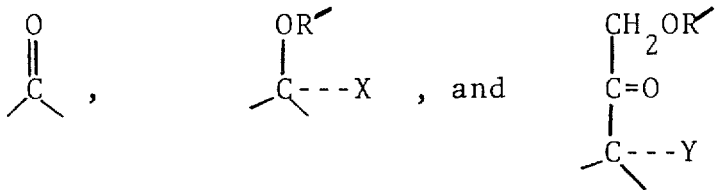

with R representing a member selected from the (SEAL)        Signed and sealed this 13th day of September 1966.

Attest:

ERNEST W. SWIDER                              EDWARD J. BRENNER

Attesting Officer                                    Commissioner of Patents

UNITED STATES PATENT OFFICE
CERTIFICATE OF CORRECTION

Patent No. 3,026,337                           March 20, 1962

Derek H. R. Barton et al.

It is hereby certified that error appears in the above numbered patent requiring correction and that the said Letters Patent should read as corrected below.

Column 4, lines 62 to 67 should appear as shown below instead of as in the patent:

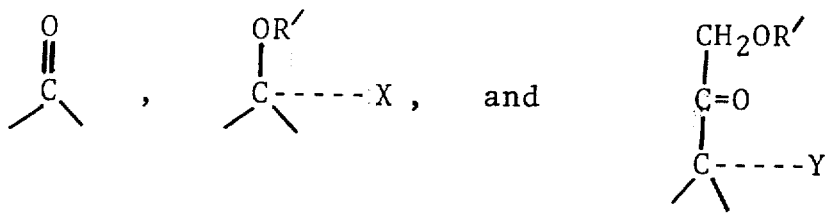

with R′ representing a member selected from the

This certificate supersedes Certificate of Correction issued September 13, 1966.

Signed and sealed this 16th day of May 1967.

(SEAL)
Attest:

EDWARD M. FLETCHER, JR.
Attesting Officer

EDWARD J. BRENNER
                                              Commissioner of Patents